(12) United States Patent
Liu et al.

(10) Patent No.: US 7,471,377 B2
(45) Date of Patent: Dec. 30, 2008

(54) LASER DISTANCE MEASURING SYSTEM WITH A SHUTTER MECHANISM

(75) Inventors: Hua-Tang Liu, Taichung (TW); Hui-Qing Chen, Hang-Zhou (CN); Ling-Ben Yu, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/881,963

(22) Filed: Jul. 30, 2007

(65) Prior Publication Data

US 2008/0036993 A1  Feb. 14, 2008

(30) Foreign Application Priority Data

Aug. 10, 2006  (TW) .............................. 95129380 A

(51) Int. Cl.
*G01C 3/08* (2006.01)
(52) U.S. Cl. .................................................. 356/5.15
(58) Field of Classification Search ....... 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 5,082,364 A * 1/1992 Russell ...................... 356/5.15
5,949,531 A * 9/1999 Ehbets et al. .............. 356/5.01

* cited by examiner

*Primary Examiner*—Thomas H Tarcza
*Assistant Examiner*—Luke D Ratcliffe
(74) *Attorney, Agent, or Firm*—Trop, Pruner & Hu, P.C.

(57) ABSTRACT

A laser distance measuring system includes an object lens, a beam splitter, a transmitter, a receiver, and a shutter mechanism. The beam splitter is disposed at one side of the object lens. The transmitter emits a laser beam that is split by the beam splitter into a measurement beam and a reference beam. The measurement beam passes through the object lens, and is reflected by an object to result in a reflected measurement beam passing through the object lens. The receiver is disposed to receive the reflected measurement beam and the reference beam. The shutter mechanism includes a beam masker operable to move to either block path of the reflected measurement beam to the receiver or path of the reference beam to the receiver.

6 Claims, 5 Drawing Sheets

LASER DISTANCE MEASURING SYSTEM WITH A SHUTTER MECHANISM

CROSS-REFERENCE TO RELATED APPLICATION

This application claims priority of Taiwanese application no. 095129380, filed on Aug. 10, 2006.

BACKGROUND OF THE INVENTION

1. Field of the Invention

The invention relates to a laser distance measuring system, more particularly to a laser distance measuring system with a shutter mechanism.

2. Description of the Related Art

U.S. Patent Application Publication Number 2001/0013929A1 discloses a device for optoelectronic distance measurement that includes two transmitters and two receivers. Two emitted light beams are respectively reflected internally and externally before being received by the receivers, respectively, thereby resulting in two measurement values. The difference between the two measurement values is then processed using analgorithm to result in a measured distance value. However, the device disclosed in this publication utilizes a large number of components, which results in complicated mechanical and circuit constructions, higher manufacturing and material costs, and a larger size. Moreover, there are inherent differences between the two transmitters and between the two receivers. Even if the two transmitters or the two receivers come from the same batch fabricated by the same manufacturer, there is no guarantee that the two transmitters or the two receivers will have identical characteristics. Therefore, measurement errors are unavoidable in the device disclosed in this publication.

U.S. Patent Application Publication Number 2004/0105087A1 discloses a laser distance measuring device that includes a transmitter and two receivers. An emitted light beam is split by a beam splitter to result in a reference light beam and a measurement light beam to be reflected by an object. The reflected measurement light beam and the reference light beam are received by the receivers, respectively, to result in two measurement values. The difference between the two measurement values is then processed using an algorithm to result in a measured distance value. However, although the measurement light beam and the reference light beam come from the same transmitter, measurement errors are still unavoidable since the measuring device includes two receivers. In particular, aside from the fact that there are inherent differences between the two receivers, one of the receivers receives the reference light beam under more ideal conditions, while the other receiver receives the reflected measurement light beam that is weaker and that has been subjected to some interference. Therefore, a bias voltage for the other receiver that receives the reflected measurement light beam is required to be larger to achieve higher gain for amplification. The difference between the bias voltages required by the two receivers is also a source of measurement error.

FIG. 1 shows a device for distance measurement that is disclosed in U.S. Patent Application Publication Number 2005/0083512A1. FIG. 2 shows an electro-optical distance measuring system that is disclosed in U.S. Pat. No. 6,781,675B2. Each of the device of FIG. 1 and the system of FIG. 2 includes a transmitter 101 and a receiver 102. Two shutter mechanisms 11 are further included in the device of FIG. 1. Through switching of the two shutter mechanisms 11 between two positions, a measurement beam for external reflection and a reference beam for internal reflection can be generated from the same light source for use in obtaining a measured distance value. However, the structure and operation of the device of FIG. 1 are difficult to realize since a change in the optical path of the reference beam can occur if the positions of the two shutter mechanisms 11 are imprecise, which can affect measurement accuracy. Moreover, the two shutter mechanisms 11 and the relevant driving mechanisms for the same will result in the disadvantage of a larger size. On the other hand, in the system of FIG. 2, the reference beam is obtained from a reflecting surface 12. In theory, the optical path of the reference beam is shorter and that of the measurement beam is longer such that the reference beam and the reflected measurement beam are received by the receiver 102 at earlier and later time points, respectively. However, in view of the response speed of the receiver 102 and the transient response of subsequent circuits, and in view of the fact that the speed of light is very fast, the late-arriving signal is likely to be affected by the early-arriving signal and is thus distorted, which leads to inaccurate measurement, especially when measuring short distances.

SUMMARY OF THE INVENTION

Therefore, the object of the present invention is to provide a laser distance measuring system that can be manufactured at a relatively low cost, that has a relatively simple construction, and that can provide accurate measurement results.

According to the present invention, there is provided a laser distance measuring system adapted for measuring distance between the system and an object. The laser distance measuring system comprises an object lens, a beam splitter, a transmitter, a receiver, and a shutter mechanism.

The beam splitter is disposed a tone side of the object lens. The transmitter is disposed at one side of the beam splitter opposite to the object lens, and is operable to emit a laser beam that is split by the beam splitter into a measurement beam and a reference beam. The measurement beam passes through the object lens to reach the object, and is reflected by the object to result in a reflected measurement beam that passes through the object lens. The receiver is disposed at said one side of the object lens to receive the reflected measurement beam passing through the object lens and the reference beam from the beam splitter. The shutter mechanism is disposed adjacent to the receiver, and includes a beam masker that is operable to move between a first position, where the beam masker blocks path of the reflected measurement beam to the receiver, and a second position, where the beam masker blocks path of the reference beam to the receiver.

When conducting a laser distance measuring operation, through blocking of the reflected measurement beam by the beam masker, the receiver is able to receive the reference beam that is not affected by the reflected measurement beam. After a response time of the receiver, the beam masker is switched to block the reference beam such that the receiver receives the reflected measurement beam that is not affected by the reference beam, thereby ensuring signal processing accuracy of subsequent circuits. In other words, this invention makes it possible to compute pure reference beams and pure reflected measurement beams to obtain a precise measurement result. This invention also achieves manufacturing requirements of a lower manufacturing cost and a simpler construction.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
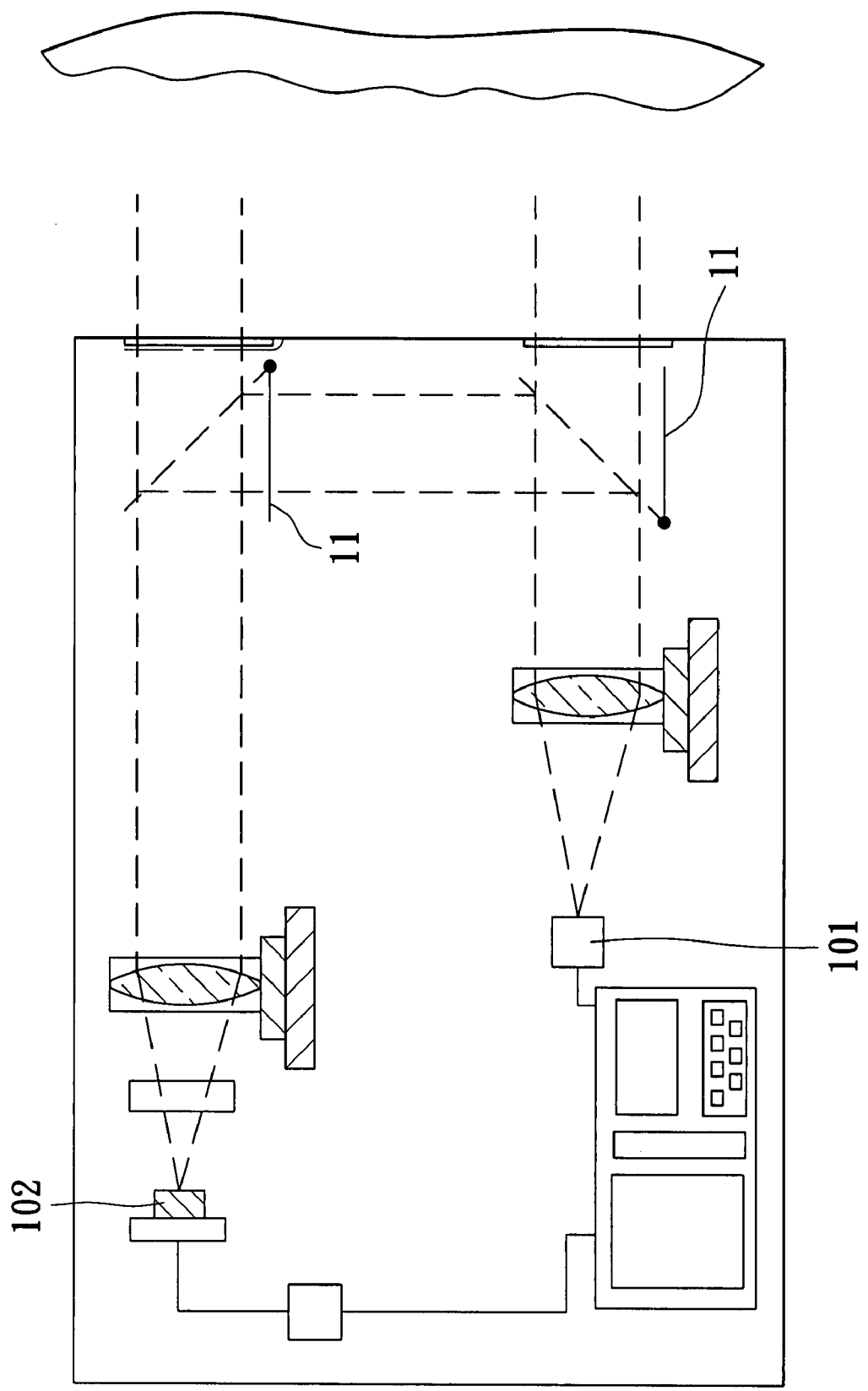
FIG. 1 is a schematic diagram of a conventional device for distance measurement disclosed in US 2005/0083512A1.
Figure 2:
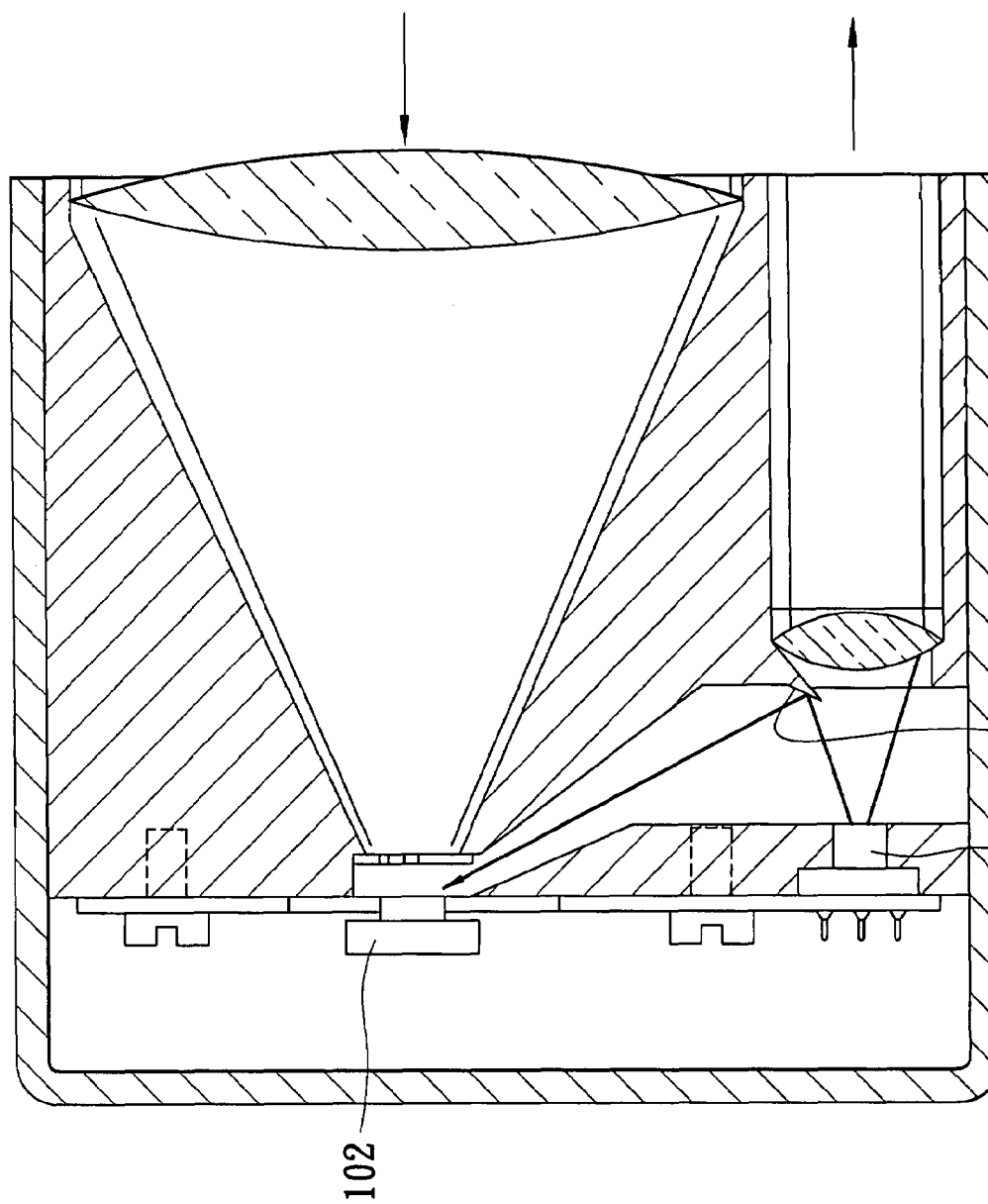
FIG. 2 is a schematic sectional view of a conventional electro-optical distance measuring system disclosed in U.S. Pat. No. 6,781,675B2.
Figure 3:
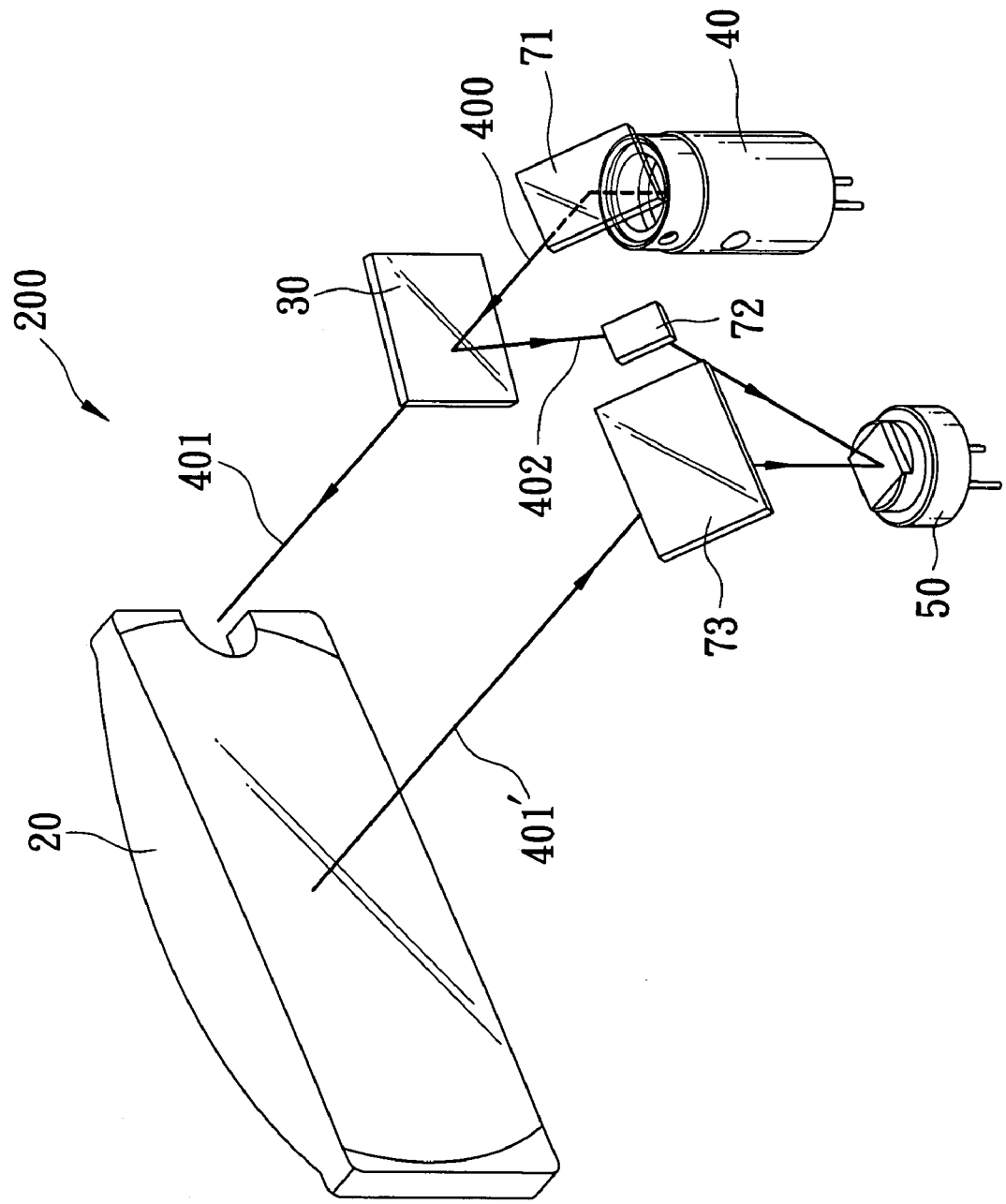
FIG. 3 illustrates the preferred embodiment of a laser distance measuring system according to the present invention.
Figure 4:
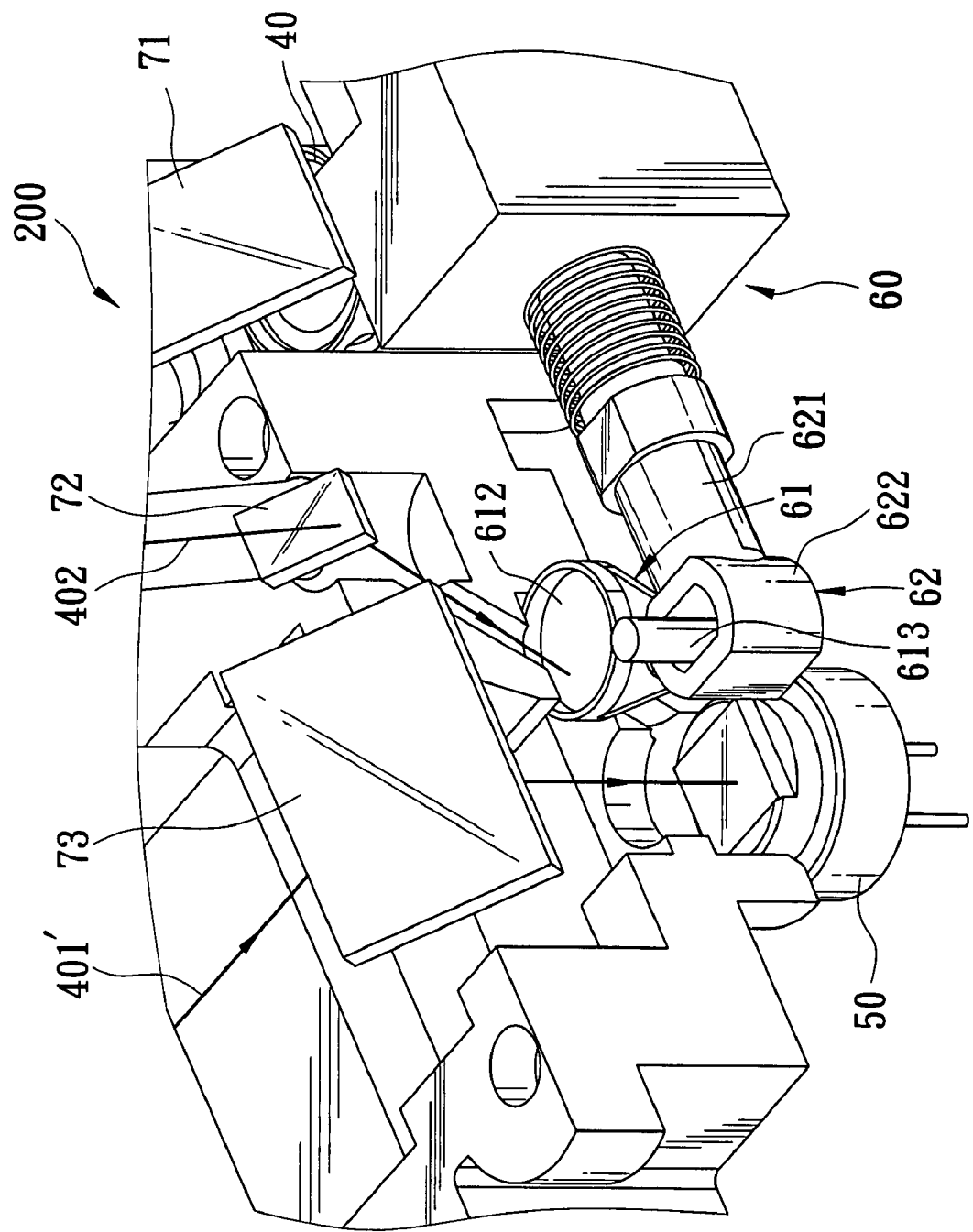
FIG. 4 is a fragmentary perspective view of the preferred embodiment, illustrating a beam masker at a second position.
Figure 5:
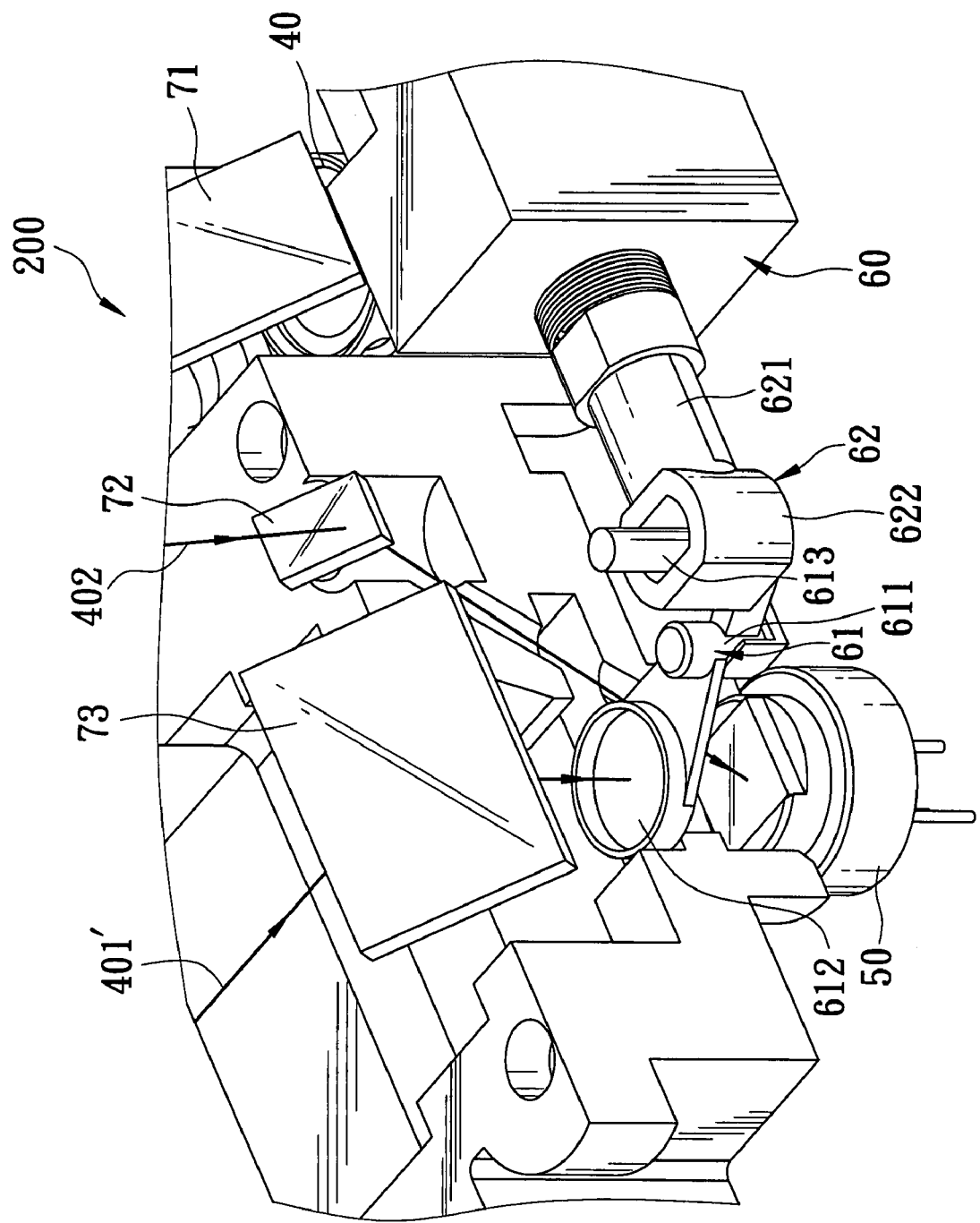
FIG. 5 is a fragmentary perspective view of the preferred embodiment, illustrating the beam masker at a first position.

Referring to FIGS. 3 to 5, the preferred embodiment of a laser distance measuring system 200 according to the present invention is shown to be adapted for measuring distance between the system 200 and an object (not shown) The laser distance measuring system 200 comprises an object lens 20, a beam splitter 30, a transmitter 40, a receiver 50, and a shutter mechanism 60.

The beam splitter 30 is disposed at a rear side of the object lens 20.

The transmitter 40 is disposed at a rear side of the beam splitter 30 opposite to the object lens 20, and is operable to emit a laser beam 400. The transmitter 40 is a laser diode. The laser beam 400 is guided by a first reflector 71 toward the beam splitter 30, and is split by the beam splitter 30 into a measurement beam 401 and a reference beam 402. The reference beam 402 is guided by a second reflector 72 toward the receiver 50. The measurement beam 401 passes through the object lens 20 to reach the object, and is reflected by the object to result in a reflected measurement beam 401' that passes through the object lens 20. The reflected measurement beam 401' is guided by a third reflector 73 toward the receiver 50.

The receiver 50 is disposed at the rear side of the object lens 20 to receive the reference beam 402 coming from the beam splitter 30 and guided by the second reflector 72, and the reflected measurement beam 401' passing through the object lens 20 and guided by the third reflector 73. The receiver 50 is an avalanche photo diode (APD) in this embodiment.

The shutter mechanism 60 is disposed adjacent to the receiver 50 and includes a beam masker 61 and an electromagnetic actuator 62.

The beam masker 61 is operable to move between a first position (see FIG. 5), where the beam masker 61 blocks path of the reflected measurement beam 401' to the receiver 50, and a second position (see FIG. 4), where the beam masker 61 blocks path of the reference beam 402 to the receiver 50. Moreover, the beam masker 61 includes a pivot rod 611 that is pivotable about an axis thereof, a masking member 612 extending from the pivot rod 611 and disposed to block and unblock the paths of the reflected measurement beam 401' and the reference beam 402 to the receiver 50, and a driven rod 613 extending from the pivot rod 611 and coupled to the electromagnetic actuator 62.

The electromagnetic actuator 62 has an electromagnet therein, and includes an extensible arm 621 and a coupling ring 622 connected to the arm 621 and sleeved on the driven rod 613. When the electromagnetic actuator 62 is not excited, the masking member 612 is at the second position (see FIG. 4). When the electromagnetic actuator 62 is excited, the arm 621 pulls the driven rod 613 through the coupling ring 622, thereby causing the beam masker 61 to pivot about the pivot rod 611 so as to move the masking member 612 to the first position (see FIG. 5).

When conducting a laser distance measuring operation, through blocking of the reflected measurement beam 401' by the beam masker 61, the receiver 50 is able to receive the reference beam 402 that is not affected by the reflected measurement beam 401'. After a response time of the receiver 50, the beam masker 61 is switched to block the reference beam 402 such that the receiver 50 receives the reflected measurement beam 401' that is not affected by the reference beam 402, thereby ensuring signal processing accuracy of subsequent circuits (not shown). In other words, the system 200 of this invention makes it possible to compute pure reference beams 402 and pure reflected measurement beams 401' to obtain a precise measurement result.

Compared to the conventional devices described hereinabove, the system 200 of this invention only needs one transmitter 40 and one receiver 50 for distance measurement. In practice, the first, second and third reflectors 71, 72, 73 may be omitted through alignment between the transmitter 40 and the beam splitter 30, and through simultaneous alignment of the receiver 50 with the beam splitter 30 and the object lens 20. The system 200 of this invention thus has a simpler construction and can be manufactured at a lower cost to meet industry requirements and to result in a better competitive edge in the market.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A laser distance measuring system adapted for measuring distance between said system and an object, said laser distance measuring system comprising:
   an object lens;
   a beam splitter disposed at one side of said object lens;
   a transmitter disposed at one side of said beam splitter opposite to said object lens, and operable to emit a laser beam that is split by said beam splitter into a measurement beam and a reference beam, the measurement beam passing through said object lens to reach the object and being reflected by the object to result in a reflected measurement beam that passes through said object lens;
   a receiver disposed at said one side of said object lens to receive the reflected measurement beam passing through said object lens and the reference beam from said beam splitter; and
   a shutter mechanism disposed adjacent to said receiver and including a beam masker that is operable to move between a first position, where said beam masker blocks path of the reflected measurement beam to said receiver and permits the reference beam to reach said receiver, and a second position, where said beam masker blocks path of the reference beam to said receiver and permits the reflected measurement beam to reach said receiver.

2. The laser distance measuring system as claimed in claim 1, wherein said shutter mechanism further includes an electromagnetic actuator for driving said beam masker to move to the first position when said electromagnetic actuator is excited, and to the second position when said electromagnetic actuator is not excited.

3. The laser distance measuring system as claimed in claim 2, wherein said beam masker of said shutter mechanism includes a pivot rod, a masking member extending from said pivot rod and disposed to block and unblock the paths of the reflected measurement beam and the reference beam to said receiver, and a driven rod extending from said pivot rod and coupled to said electromagnetic actuator.

4. The laser distance measuring system as claimed in claim 1, further comprising a reflector disposed between said transmitter and said beam splitter for guiding the laser beam from said transmitter toward said beam splitter.

5. The laser distance measuring system as claimed in claim 1, further comprising a reflector disposed between said receiver and said beam splitter for guiding the reference beam from said beam splitter toward said receiver.

6. The laser distance measuring system as claimed in claim 1, further comprising a reflector disposed between said receiver and said object lens for guiding the reflected measurement beam passing through said object lens toward said receiver.

* * * * *